United States Patent Office 2,926,152
Patented Feb. 23, 1960

2,926,152

THERMAL STABILIZATION OF HALOETHYLENE POLYMERS

David A. Gordon, Midland, Mich., assignor to The Dow Chemical Company, Midland, Mich., a corporation of Delaware No Drawing. Application December 17, 1956
Serial No. 628,516

11 Claims. (Cl. 260—23)

This invention relates to the thermal stabilization of haloethylene polymers. More particularly it relates to new compositions based on haloethylene polymers having improved thermal stability over the prior known compositions.

It is known that haloethylene polymers, such as polyvinyl chloride and the copolymers of vinyl chloride and vinylidene chloride, undergo appreciable degradation and darkening when heated during thermal fabrication operations and when the fabricated articles are exposed for prolonged periods to elevated temperatures. Such thermal sensitivity has seriously limited the applications in which haloethylene polymers may be employed. One of the common means for alleviating that degradation has been to employ certain additives as heat stabilizers in the polymer formulations. Those additives have consisted commonly of inorganic salts, such as tetrasodium pyrophosphate, which frequently were incompatible with the polymer prohibiting the production of transparent articles, were high melting causing slubs in the articles and lower fabrication efficiencies, and were hygroscopic causing gasing during fabrication. Other heat stabilizers that were employed were organo-metallic compounds which were expensive and difficult to prepare and in some instances caused degradation of the plasticizers used in the formulation. The requirements of a suitable heat stabilizer can be seen to be manifold and varied. It must be compatible with and inert to all elements of the formulation. It must be odor-free and not impart a color to the formulation. It is desirable that it be non-toxic and tasteless. It should be insoluble in water and the common household solvents. In view of those many requirements, it is impossible for an investigator to predict the effectiveness of any particular compound as a stabilizer with any degree of certainty, and continuous search is being made for new and more effective heat stabilizers.

It is accordingly an object of this invention to provide a novel heat stabilized composition based upon haloethylene polymers.

It is a further object to provide such compositions which are thermally stabilized with metal-free organic stabilizers.

The above and related objects are achieved with a composition comprising a haloethylene polymer and stabilizing quantities of an ester of an alcohol selected from the group consisting of diphenyl methyl alcohols and 9-fluorenols. Compositions thus prepared show outstanding stability to the degradative effects of elevated temperatures.

Any polymer containing halide groups pendant from the carbon chain may be stabilized with the esters of this invention. As typical examples may be mentioned the polymers of vinyl chloride and vinylidene chloride and the copolymers of vinyl chloride and vinylidene chloride with each other or with another monoethylenically unsaturated monomer, such as arcrylonitrile or vinyl acetate. The polymers and copolymers composed predominantly of vinylidene chloride are known to be particularly sensitive to thermal exposure and accordingly are preferred subject materials to be stabilized in accordance with the invention.

The stabilizers useful in the compositions of this invention are those esters wherein the alcohol portion is a diphenylmethyl alcohol or 9-fluorenol. The diphenylmethyl alcohol or 9-fluorenol may be nuclearly substituted on the aromatic groups with substituents, such as alkyl, alkoxy, or halogen, which are inert to all elements of the polymer formulation. Although any number of substituents up to 5 for each phenyl group in the diphenylmethyl alcohol and up to 4 for each phenyl group in the 9-fluorenol may be used without loss of stabilizing effectiveness, the number of substituents actually used will usually not exceed 1 for each group for economic and practical reasons.

The acid portion of the ester may be any organic carboxylic acid capable of esterification with the diphenylmethyl alcohol or 9-fluorenol. The acids may be mono-, di-, or poly-carboxylic acids and may be either aliphatic or aromatic. The acids may contain substituents, such as alkyl, alkoxy, and halogen, which are inert to the elements of the polymer formulation. For economic reasons it is preferred to use acids having up to 18 carbon atoms.

The esters are easily prepared by the conventional esterification reactions using the acid and alcohol corresponding to that in the desired compound. Such materials are readily available. Typical examples of the esters are:

Diphenylmethyl benzoate
Bis (diphenylmethyl) phthalate
Diphenylmethyl-p-ethoxybenzoate
Diphenylmethyl-2,4-dichlorobenzoate
Diphenylmethyl pelargonate
Diphenylmethyl palmitate
Bis (diphenylmethyl) succinate
Bis (diphenylmethyl) fumarate
9-fluorenyl acetate The esters of this invention show stabilizing effectiveness when used in an amount of from 1 to 10 percent of the weight of the polymer. It is preferred, however, to use them in an amount of from 1 to 6 percent by weight. When less than 1 percent is used, there is little stabilization noticed. When more than 10 percent is used, the stabilizers become economically unattractive, no additional benefits accrue, and some of the physical properties of articles made from the composition may suffer.

The esters of this invention are odorless, tasteless, non-toxic, and relatively odor-free. Thus white, pastel-colored, and transparent articles may be prepared without their appearance being affected by the stabilizer. Also articles prepared from such compositions are more merchandisable than many of the prior compositions due to their freedom from odor, taste, or exudation or leaching of the stabilizer. Because of their completely organic nature the ethers are capable of greater compatibility with the polymers than the inorganic or organo-metallic stabilizers heretofore used.

The esters may be employed with the other common additives used in haloethylene polymer formulations without any adverse effect resulting therefrom. Typical of such additives are light stabilizers, fillers, pigments, and dyes.

The effectiveness and advantages of these esters will be more apparent from the following illustrative example wherein all parts and percentages are by weight.

Example

Several samples were prepared from a basic formulation consisting of 91 parts of a copolymer prepared from 85 percent vinylidene chloride and 15 percent vinyl chloride, 2 parts of tertiary butyl salol as a light stabilizer, and 4 parts of ethyl phthalyl ethyl glycolate as a plasticizer. One of the samples was left unstabilized for use as a blank, and to another for comparison was added 1 percent of an epoxidized glyceride sold commercially as Paraplex G-60 by the Rohm and Haas Company. To the other samples were added 3 parts of various stabilizers of this invention. The samples were all evaluated according to a standard test. In that test a sample of at least 20 grams of the formulation is subjected to a temperature of 178 degrees C. and the pressure of the evolved hydrohalide gas is used to determine the degree of thermal degradation. The results are relative to a standard and are reported as "T" values, which are the times required for the samples to reach an arbitrary rate of pressure rise. Thus, a more thermally stable composition will have a higher "T" value than a less stable composition. The results are listed in the following table.

| Stabilizer | "T" Value |
|---|---|
| For Comparison: | |
| None | 3.0 |
| Epoxidized glyceride | 9.5 |
| Esters Of This Invention: | |
| Diphenylmethyl benzoate | 12.0 |
| Diphenylmethyl-p-ethoxybenzoate | 12.0 |
| Diphenylmethyl-2,4-dichlorobenzoate | 9.0 |
| Diphenylmethyl-3,4-dichlorobenzoate | 9.0 |
| Diphenylmethyl octanoate | 11.0 |
| Diphenylmethyl palmitate | 10.0 |
| Diphenylmethyl stearate | 9.0 |
| Bis (diphenylmethyl) succinate | 12.0 |
| Bis (diphenylmethyl) oxalate | 9.0 |
| Bis (diphenylmethyl) fumarate | 10.0 |
| Bis (diphenylmethyl) adipate | 11.0 |
| Bis (diphenylmethyl) phthalate | 11.0 |
| 9-fluorenyl acetate | 8.0 |

The results show that the esters of this invention are as effective in stabilizing the polymer as commercially used materials.

Similar results are observed when the alcohols are employed as stabilizers in compositions based on the polymer and copolymers of vinyl chloride and also when the phenyl groups of the benzhydryl group are substituted with methyl, methoxy, and chlorine.

I claim:

1. A thermally stable composition comprising a resinous chloroethylene polymer and stabilizing amounts of an ester which is the reaction product of (1) an organic carboxylic acid and (2) an alcohol selected from the group consisting of diphenylmethyl alcohol, 9-fluorenol and a diphenylmethyl alcohol having a nuclear substituent on a phenyl group, said nuclear substituent being selected from the group consisting of methyl, methoxy, and halogen.

2. The composition claimed in claim 1 wherein said ester is present in an amount of from 1 to 10 percent by weight of said chloroethylene polymer.

3. The composition claimed in claim 1 wherein said chloroethylene polymer is a copolymer composed predominantly of vinylidene chloride with any remainder being of a monoethylenically unsaturated comonomer.

4. The composition claimed in claim 1 wherein the alcohol portion of said ester is diphenylmethyl alcohol.

5. The composition claimed in claim 4 wherein said ester is diphenylmethyl benzoate.

6. The composition claimed in claim 4 wherein said ester is diphenylmethyl-p-ethoxybenzoate.

7. The composition claimed in claim 4 wherein said ester is bis (diphenylmethyl) phthalate.

8. The composition claimed in claim 4 wherein said ester is diphenylmethyl palmitate.

9. The composition claimed in claim 4 wherein said ester is bis (diphenylmethyl) adipate.

10. The composition claimed in claim 1 wherein said organic carboxylic acid is an aliphatic carboxylic acid containing up to 18 carbon atoms.

11. The composition claimed in claim 1 wherein said organic carboxylic acid is an aromatic carboxylic acid.

References Cited in the file of this patent

UNITED STATES PATENTS 2,306,880     Heymann     Dec. 29, 1942

FOREIGN PATENTS 455,527     Canada     Mar. 29, 1949